April 16, 1968 R. K. CRICHTON ETAL 3,377,934
BOREHOLE CAMERA
Filed April 23, 1965 2 Sheets-Sheet 1

INVENTORS
RAYMOND K. CRICHTON
DAVID O. STERRETT
BY
McLaughlin, Cahill & Drummond
ATTORNEYS 3,377,934
BOREHOLE CAMERA
Raymond K. Crichton, P.O. Box 86, Eloy 85231, and David O. Sterrett, Tucson, Ariz.; said Sterrett assignor to said Crichton
Filed Apr. 23, 1965, Ser. No. 450,379
5 Claims. (Cl. 95—11)

ABSTRACT OF THE DISCLOSURE

A borehole camera utilizing a continuously energized electric motor which, when the brake holding the motor against rotation is released, advances film and subsequently trips the shutter of a camera to photograph the walls of the borehole. Continuously energized external illumination provides the necessary illumination for exposing the film.

---

Our invention relates to a borehole camera apparatus and more particularly to a remote control borehole camera utilizing a continuously energized electric motor in combination with a continuous source of illumination.

In well boreholes it often becomes necessary to examine the walls of the borehole to determine with reasonable exactness the structure of the earth formations encountered. A camera is advantageously employed for this purpose since it may be lowered to the desired depth and a permanent record made for later study. The operation of the camera is controlled at the surface of the borehole by an operator manipulating various controls. Prior art cameras intended for uses similar to that of the present invention have usually been complicated and have required close attention by the operator to properly explore and photograph the walls of the borehole. One of the chief disadvantages of the prior art devices have been the utilization of flash units for providing light for exposing the film. It therefore becomes necessary to either have separate controls to advance the film and energize the flash or to utilize a complicated mechanical scheme for sequentially achieving the desired sequential operation of the various components. Further, the utilization of flash-type light sources incurs difficulty when conditions vary in the borehole; for example, in those instances where water is contained in the borehole and substantial suspended matter is in the water, the light necessary for proper development becomes a matter of significant importance. Flash-type lamps do not permit a wide selection of exposure conditions. In addition to the difficulties enumerated above, flash-type arrangements present significant limitations upon the choice of the film, such as sensitive wave length, exposure rates, and the previously mentioned variability of the media existing between the object to be photographed (the borehole wall) and the film.

To achieve the necessary simplicity in the control of well borehole examination and nevertheless avoid the problems encountered by prior art flash-type units, several attempts have been made at complicated mechanical structures for sequencing the operation of various components of a camera. The end result has invariably been a complicated and thus expensive device suffering from the lack of reliability and necessarily including great bulk.

It is therefore an object of the present invention to provide a borehole camera mechanism utilizing continuous illumination of the borehole.

It is also an object of the present invention to provide a borehole camera mechanism which enables the operator to simply and efficiently energize the mechanism to photograph the wall of a borehole in one step.

It is another object of the present invention to provide a borehole camera mechanism utilizing a continuously energized electric motor that efficiently, upon receipt of a signal from a remote source, cocks and trips the shutter mechanism as well as advancing the film for the photograph to be taken.

Other objects and advantages of the present invention will become apparent to those skilled in the art as the description thereof proceeds.

Briefly, in accordance with the embodiment chosen for illustration, the present invention comprises a combination of a continuously energized electric motor and a continuously energized illumination source, both of which are energized through the expediency of a remotely located source of electrical power. Photographs of borehole walls are achieved by applying a signal to an electric motor brake to release the electric motor shaft and permit the motor to rotate. The rotation of the electric motor advances the film and cocks the shutter and subsequently trips the shutter to take the photographs. All of these events are properly sequenced through the single revolution of the continuously energized electric motor. The rotation of the motor shaft is stopped by the brake until the brake receives a subsequent electric signal.

The present invention may more readily be described by reference to the accompanying drawings in which.

Figure 1:
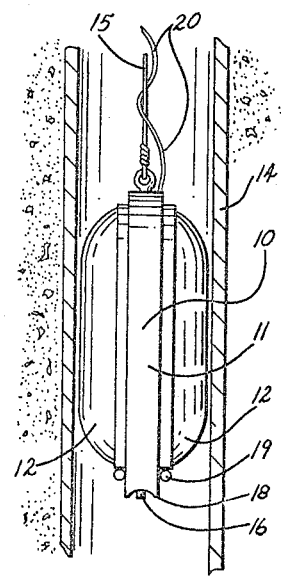
FIGURE 1 is an elevation illustrating our borehole camera in a typical cased borehole.

With particular reference to FIGURE 1, our borehole camera, generally designated by the reference character 10, has a body portion 11 to which guides 12 are secured. The guides 12 serve to guide the camera 10 in the borehole and engage the walls or casing of the borehole 14 in a sliding manner. A supporting line 15 determines the depth to which the borehole camera is lowered and supports the camera where desired. The camera lens 16 is located at the bottom end of the camera body 11 and is protected by flanges or lip members 18. A source of illumination 19 such as a circular lamp or other appropriate means is positioned to provide illumination for the subject matter to be photographed. The illumination means 19 is continuously energized and draws its power through a power line 20 which also provides power and actuation stimuli for the other portions of the camera.

In operation, the camera is actuated from the surface through the power line 20 which may be a complex cable having as many as five or more electrical wires therein. Actuation of the camera causes the mechanism thereof to advance the film, cock the shutter and snap the shutter, thereby obtaining a photographic image at the desired depth. The interior of the camera and the various electrical equipment are sealed to prevent leakage when the borehole contains fluid. Because of the continuous illumination of the borehole by the illuminating member 19, the need for intricate flash illumination means is obviated.

Except for the actuation circuit, the other electrical circuits; i.e., illumination and motor circuitry, in the borehole camera are continuously energized by power from the surface of the ground. The camera may be lowered at a given rate and the actuation circuit energized at predetermined intervals to obtain the desired sequence of pictures, or the camera may be lowered or raised to the particular desired depth and one or more pictures obtained at that level in the borehole.

The success of our borehole camera is due in large part to two main factors, the first of which is the continuous source of illumination which obviates the need for complex and sometimes dangerous flash equipment. A second important feature of our borehole camera is that of a continuously energized motor which may be stalled without adversely affecting its windings or other parts. A motor useful in our invention is the unidirectional double oscillator motor produced by Enercon and designated "Enercon 45." Power for the continuous energizing of the motor is supplied through the power cable 20 as hereinbefore described. Actuation of the camera mechanism by an operator at the surface of the ground unblocks the continuously energized motor which operates through a cycle in which the necessary functions of cocking the shutter, releasing the shutter, and advancing the film are performed without further stimulation by the camera operator. If so desired, continuous stimulation by the operator will cause the camera to repeat its cycle and take sequential pictures until the signal is terminated. Thus, either one picture or a series of pictures may be obtained, as desired.

Figure 3:
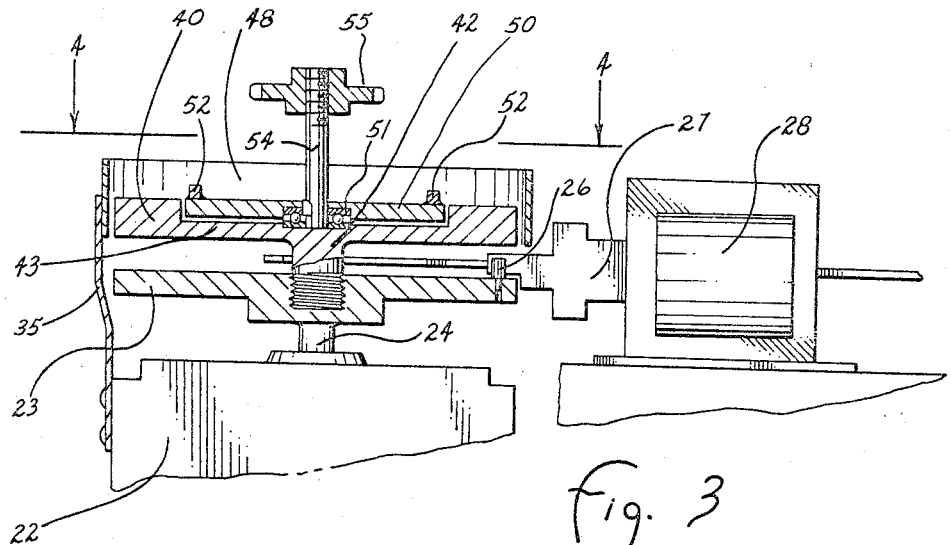
FIGURE 3 is a partial elevation partially in section taken along 3—3 of FIGURE 2 but with the various parts in assembled relation.
Figure 4:
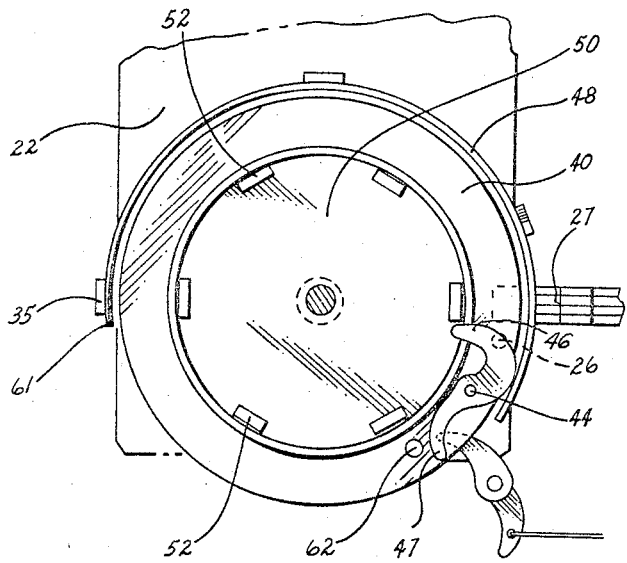
FIGURE 4 is a plan view taken along 4—4 of FIGURE 3.
Figure 2:
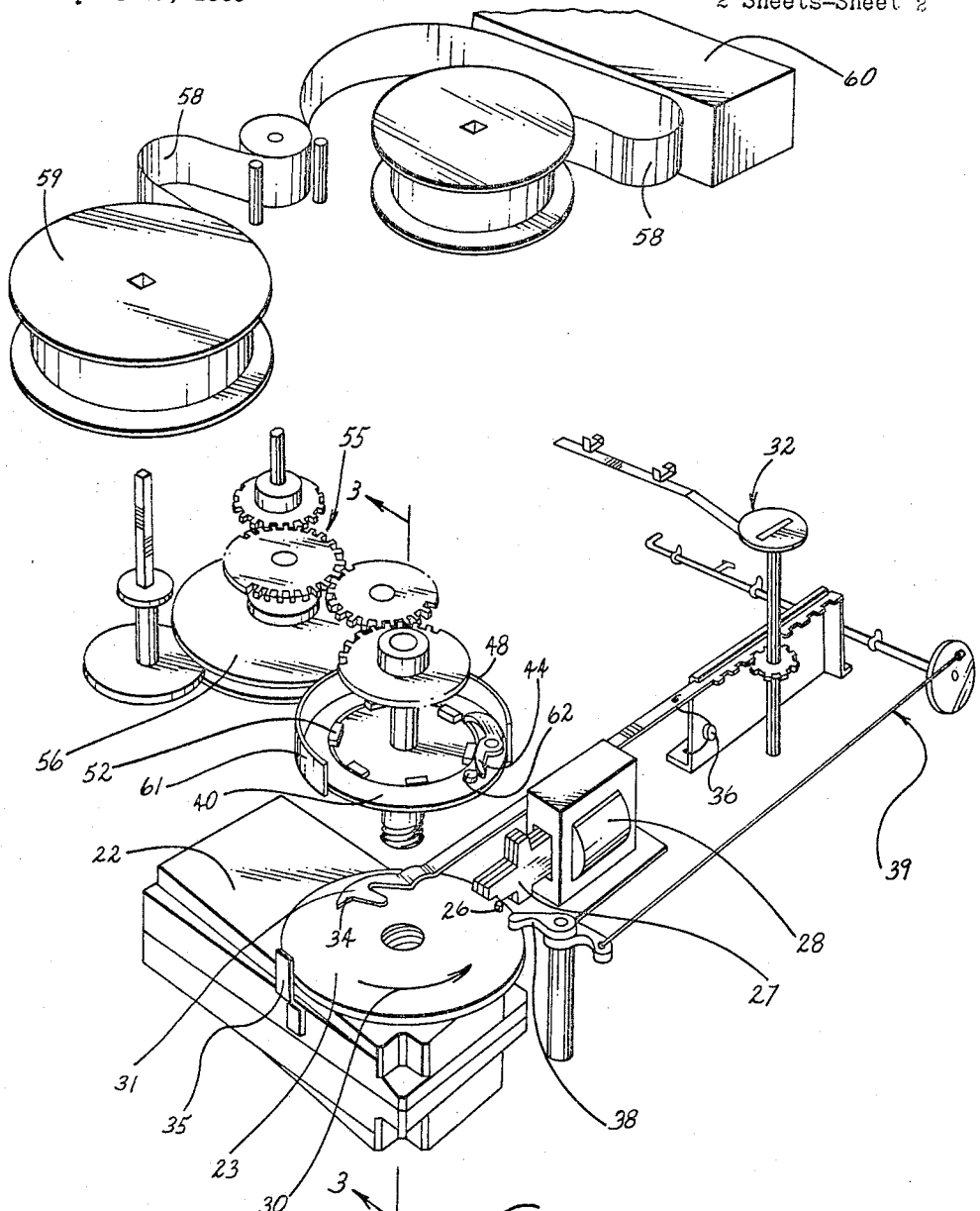
FIGURE 2 is an exploded isometric illustrating the relative positioning of a film-advancing, shutter-cocking and shutter-releasing mechanism in one embodiment of our invention.

Referring now to FIGURES 2–4, a continuously energized electric motor 22 drives a disc member 23 secured to its output shaft 24. Disc member 23 carries an activation lug 26 substantially rigidly affixed thereto and extending substantially perpendicular to the upper surface of said disc member.

Activation lug 26 engages a brake arm 27 actuated by a solenoid 28 connected through power line 20 with the stimulation or activation circuit. In its normal de-energized condition, the brake arm 27 and solenoid brake 28 are positioned to arrest the movement of the disc member 23. Upon activation of the solenoid 28 from the surface, the brake arm 27 is retracted and withdrawn from contact with the activation lug 26 and the disc member rotates in the direction shown by the arrow 30.

As the disc member 23 rotates, the activation lug 26 comes in contact with a hook member 31 thereby to actuate shutter-cocking mechanism, generally designated by the reference character 32. Rotation of the disc member 23 carries the hook member 31 through a portion of the cycle of said disc member, thereby cocking the shutter mechanism 32. The hook member 31 is carried by the activation lug 26 until a toe 34 on the hook member 31 engages a stop finger 35. With the movement of the hook member arrested by the finger member 35, the activation lug 26 disengages from the hook member and the hook member is returned to its original position by spring means 36.

As disc member 23 continues to rotate in the direction shown by the arrow 30, activation lug 26 contacts a trigger 38, thus tripping the shutter mechanism, generally designated by the reference character 39. Activation lug 26 then contacts the brake arm 27 and its movement is arrested thereby, thus completing a full 360 degree rotation of the disc member 23. If the solenoid 28 is maintained in an energized condition, the disc member will continue to rotate and repeat the cycle of cocking and releasing the shutter until the brake arm 27 is released to contact and arrest the movement of activation lug 26.

It is to be noted that if the solenoid brake 28 and its brake arm 27 are positioned ahead of the trigger 38 in the cycle, a previously cocked shutter may be tripped as the first part of the action of the apparatus with recocking of the shutter following in sequence of time.

A flat driving disc 40 in a plane substantially parallel to the plane of disc member 23 has an axial stem 42 integral with the bottom side thereof and has a recessed central upper portion 43. A dog 44 is pivotally mounted near the periphery of the driving disc 40. The dog has a forward member 46 and a following member 47. The axial stem 42 threadedly engages the disc member 23 and is driven thereby.

A stationary guide rail 48 encloses a portion of the periphery of the driving disc 40. A disc-shaped driven member 50 is mounted in the recessed portion 43 of the driving disc 40 and fits flush with the top portion of the driving disc to form a substantially continuous upper surface therewith. Bearing means such as roller bearings 51 are provided to permit easy movement of driven member 50 relative to driving disc 40 where appropriate. Driven member 50 has a plurality of lug members 52 secured on its top surface and near the outer periphery thereof. A stem member 54 moves with driven member 50 and actuates the film-advance mechanism including a gear train, generally designated by the reference character 55, when the driven member 50 rotates. When the gear train 55 rotates, a friction clutch assembly 56 advances film 58 and winds exposed film on the take-up spool 59. Exposure of the film 58 occurs in a shutter and lens assembly 60 schematically illustrated in FIGURE 2.

As the driving disc 40 rotates with the disc member 23, the forward portion 46 of the dog 44 contacts the guide rail 48 and is cammed inwardly to engage one of the lug members 52 on the driven member 50. As the driving disc rotates, the dog pushes the lug with which it is in contact, thereby causing the driven member 50 and the gear train 55 to rotate. Because of the arcuate shape of the forward portion of the dog member 44, when the dog passes the end 61 of the guide rail 48, the forward portion of the dog member cams away from contact with the lug member 52 and no longer drives it. A stop member 62 is provided on the driving disc to prevent the following portion 47 of the dog member from fouling with the lug members 52 when the forward portion 46 cams out of contact therewith. The arcuate length of guide rail 48 depends on the portion of the arc necessary to complete the film advance and may be more or less than the arc shown. When the forward portion 46 of the dog member 44 is not in contact with the guide rail 48, the driving disc 40 continues to rotate and the driven member 50 remains stationary.

Thus, in a single 360 degree rotation of the disc member 23, the driving disc 40 actuates the gear train 55 to advance the film, the lug 26 engages hook member 31 to cock the shutter through shutter-cocking mechanism 32, and the shutter is released by contact of the lug member 26 with the shutter-release trigger 38. In the embodiment illustrated in the drawings, the film is advanced and the shutter is cocked substantially simultaneously after the solenoid is energized to permit the disc member 23 to rotate. When the shutter has been cocked and the film has been advanced, the shutter is released, thereby to take the desired picture. Illumination of the subject matter to be photographed is obtained from continuously energized means such as a flood lamp or lamps in any desired configuration. Flashbulbs or similar complex and possibly dangerous types of illumination are thereby substantially obviated.

A certain time lag follows the energizing of the solenoid before the shutter is tripped in the embodiment shown. If desired, the sequence may be changed as hereinbefore discussed so that the shutter is tripped first to obtain a picture at substantially the same time the solenoid is energized, with cocking of the shutter and advancing of the film following exposure of the film. When our invention is employed, the only communication with the surface is the necessary electrical wiring for the illumination, the motor and the solenoid means through power line 20 and supporting wire 15.

Various modifications may be made in our invention without departing from the spirit or scope thereof, and it is to be understood that we limit ourselves only as defined by the appended claims.

We claim:

1. A borehole camera comprising a body portion supporting a lens and shutter assembly; a continuously energized electrical illumination source disposed to direct illumination outside said body portion; a continuously energized electric motor disposed in said body portion; means secured to the output shaft of said motor and rotatable therewith; a remotely actuated brake engaging said means and arresting movement thereof; a shutter-cocking mechanism, a film-advance mechanism and a shutter-release mechanism disposed in said body portion and receiving operative power from said motor, whereby actuation of said brake releases said means and said means operates said shutter-cocking mechanism, said film-advance mechanism and said shutter-release mechanism.

2. A borehole camera comprising a body portion supporting a lens and shutter assembly, a continuously energized electrical illumination source disposed to direct illumination outside said body portion, a continuously energized electric motor disposed in said body portion, a disc member secured to the output shaft of said motor and rotatable therewith, a remotely actuated solenoid brake engaging said disc member and arresting movement thereof, a shutter-cocking mechanism, a film-advance mechanism and a shutter-release mechanism disposed in said body portion and receiving operative power from said motor, whereby actuation of said solenoid brake releases said disc member and said disc member operates said shutter-cocking mechanism, said film-advance mechanism and said shutter-release mechanism.

3. A borehole camera comprising a body portion supporting a lens and shutter assembly, a continuously energized electrical illumination source disposed to direct illumination outside said body portion, a continuously energized, safely stallable electric motor disposed in said body portion, a disc member secured to the output shaft of said motor and rotatable therewith, an activation lug carried by said disc member, a remotely actuated solenoid brake having a retractable brake arm engaging said activation lug and arresting rotation of said disc member, a shutter-cocking mechanism operated by said activation lug through a portion of the cycle of said disc member, a shutter-release mechanism operatively contacted by said activation lug at a point in the cycle of said disc member, a driving disc rotatable with said disc member, a driven member positioned in a recessed central portion of said driving disc and driven by said driving disc during a portion of the rotation of said driving disc, and a film-advance mechanism rotatably operative with said driven member.

4. A borehole camera comprising a body portion supporting a lens and shutter assembly, a continuously energized electrical illumination source disposed to direct illumination outside said body portion, a continuously energized, safely stallable electric motor disposed in said body portion, a disc member secured to the output shaft of said motor and rotatable therewith, an activation lug carried by said disc member, a remotely actuated solenoid brake having a retractable brake arm engaging said activation lug and arresting rotation of said disc member, a shutter-cocking mechanism having a hook member carried by said activation lug through a portion of the cycle of said disc member thereby to cock the shutter, a shutter-release mechanism having a trigger operatively contacted by said activation lug at a point in the cycle of said disc member, a driving disc rotatable with said disc member, said driving disc having a dog pivotally mounted near its periphery and having a recessed central portion, a driven member rotatably positioned in said recessed portion and having a plurality of lug members secured near its outer periphery, a guide rail enclosing a portion of the periphery of said driving disc and forcing said dog into driving engagement with a lug member on said driven member through a portion of the rotation of said driving disc, and a film-advance mechanism rotatably operative with said driven member.

5. The borehole camera of claim 4 having a plurality of guides secured to the outer surface of said body portion and a protective flange positioned outside said body portion near said lens.

References Cited
UNITED STATES PATENTS

| | | | |
|---|---|---|---|
| 2,161,380 | 6/1939 | Opocensky | 95—11 |
| 2,338,991 | 1/1944 | Arnold | 95—11 |
| 2,468,781 | 5/1949 | Roganti | 95—12.5 |
| 2,794,944 | 6/1957 | Laval | 95—11 |
| 3,007,385 | 11/1961 | Fukuoka | 95—31 |
| 3,172,344 | 3/1965 | Jackson | 95—11 |
| 3,279,085 | 10/1966 | Reinhart | 95—11 |

NORTON ANSHER, *Primary Examiner.*

JOHN M. HORAN, *Examiner.*

F. L. BRAUN, *Assistant Examiner.*